United States Patent [19]

Taubitz et al.

[11] Patent Number: 4,774,286
[45] Date of Patent: Sep. 27, 1988

[54] THERMOPLASTIC MOLDING MATERIALS BASED ON POLYCARBONATES AND POLYESTERS

[75] Inventors: Christof Taubitz, Wachenheim; Hans-Henning Hub, Worms; Konrad Mitulla, Ludwigshafen; Manfred Knoll, Wachenheim, all of

[73] Assignee: BASF Aktiengesellschaft, Rheinland-Pfalz, Fed. Rep. of Germany

[21] Appl. No.: 2,238

[22] Filed: Jan. 12, 1987

[30] Foreign Application Priority Data

Jan. 20, 1986 [DE] Fed. Rep. of Germany ....... 3601422

[51] Int. Cl.$^4$ ............................................. C08L 69/00
[52] U.S. Cl. ...................................... 525/67; 525/68; 525/69; 525/148
[58] Field of Search .................... 525/67, 74, 148, 439, 525/466, 68, 69

[56] References Cited

U.S. PATENT DOCUMENTS

| | | |
|---|---|---|
| 3,864,428 | 2/1975 | Nakamura et al. .................... 525/67 |
| 4,034,013 | 7/1977 | Lane ................................... 525/64 X |
| 4,482,672 | 11/1984 | Neuray et al. ......................... 525/67 |
| 4,596,851 | 6/1986 | Lindner et al. ........................ 525/67 |
| 4,654,400 | 3/1987 | Lohmeijer et al. ................... 525/64 |

*Primary Examiner*—Theodore E. Pertilla
*Attorney, Agent, or Firm*—Oblon, Fisher, Spivak, McClelland & Maier

[57] ABSTRACT

Thermoplastic molding materials based on
(A) polycarbonates and
(B) polyesters containing from 1 to 30% by weight, based on (A)+(B)+(C),
(C) of a graft copolymer based on
(C$_1$) from 60 to 99% by weight of an elastomeric component based on acrylic acid esters, methacrylic acid esters and/or conjugated dienes as well as, if desired, further comonomers, as graft base and
(C$_2$) from 1 to 40% by weight of an expoxy-containing monomer as applied graft.

9 Claims, No Drawings

THERMOPLASTIC MOLDING MATERIALS BASED ON POLYCARBONATES AND POLYESTERS

The present invention relates to thermoplastic molding materials based on polycarbonates and polyesters, to the use thereof for producing moldings, and to the moldings produced from the thermoplastic molding materials.

Polymer mixtures of thermoplastic polyesters and polycarbonates are known per se. Compared with the pure polyesters, they have improved mechanical properties, in particular an improved impact strength, as revealed in DE-A No. 2,417,002.

To improve the impact strength of polyester/polycarbonate mixtures, in particular at low temperatures, various methods are known.

In DE-C No. 2,343,609, a mixture of polycarbonate and polyester has added to it from 2 to 35% by weight of a graft copolymer of polybutadiene onto which a shell of vinyl monomer has been grafted.

EP-A No. 20,737 discloses polyester/polycarbonate mixtures which contain selectively hydrogenated styrene/diene block copolymers.

EP-A No. 20,605 reveals that the impact strength of polyesters or polycarbonates can be improved by adding ethylene copolymers.

Finally, EP-A No. 106,027 describes mixtures which are composed of polycarbonate, an ethylene copolymer, a polyester and a graft rubber.

However, frequently the abovementioned molding materials do not meet the ever increasing demands in respect of impact strength and heat distortion resistance, and the processability and the chemical resistance are frequently unsatisfactory.

It is an object of the present invention to provide molding materials based on polycarbonates and polyesters which do not have these disadvantages. In particular the chemical resistance is to be improved.

We have found that this object is achieved with thermoplastic molding materials based on (A) polycarbonates and
(B) polyesters which contain from 1 to 30% by weight, based on (A)+(B) +(C), of a graft copolymer (C) which is composed of
(C$_1$) from 60 to 99% by weight of an elastomeric component based on acrylic acid esters, methacrylic acid esters and/or conjugated dienes as well as, if desired, further comonomers as graft base and
(C$_2$) from 1 to 40% by weight of an epoxy-containing monomer as applied graft.

Preferred embodiments of the thermoplastic molding materials according to the invention are revealed in the subclaims.

The molding materials according to the invention exhibit an excellent cold impact strength coupled with a very high heat distortion resistance and chemical resistance.

In what follows, the construction of the molding materials according to the invention from the components is described.

Component (A)

For the purposes of the present invention, polycarbonates include not only homopolycarbonates but also copolycarbonates. Preferably the polycarbonates are prepared starting from diphenols, for example dihydroxybiphenyls, di(hydroxyphenyl)alkanes and di(hydroxyphenyl) ethers. In principle, however, any other diphenol suitable for preparing a polycarbonate can be used. Relevant details can be found in the monograph by H. Schnell, "Chemistry and Physics of Polycarbonates", Interscience Publ., New York 1964, and U.S. Pat. No. 2,999,835 and DE-A No. 2,248,817. Polycarbonates based on 2,2-di(4-hydroxyphenyl)propane (hereinafter referred to as bisphenol A) are particularly preferred.

These polycarbonates can be synthesized in a conventional manner as described in more detail for example in U.S. Pat. No. 2,999,835 and GB-A No. 772,627.

The relative viscosity $\eta_{spec}/c$ (according to E. Vollmert, Grundriss der makromolekularen Chemie, Volume 3, pages 55 et seq., E. Vollmer-Verlag, Karlsruhe 1979) of the polycarbonates used is preferably within the range from 1.1 to 1.5 ml/g (measured on a 0.5% strength solution in dichloromethane at 25° C.), which corresponds to an average molecular weight $M_n$ of from 25,000 to 200,000.

The proportion of component (A) in the molding materials according to the invention is basically not subject to any special restriction, but is preferably within the range from 8 to 90% by weight, based on the total weight of components (A)+(B)+(C).

Component (B)

The polyesters present in the molding materials according to the invention are likewise known per se. It is preferred to use polyesters which contain an aromatic ring in the main chain. The aromatic ring can also be substituted, for example by halogens, such as chlorine and bromine and/or by C$_1$–C$_4$-alkyl groups, for example methyl, ethyl, i- or n-propyl and i- or n- or t-butyl groups.

The preparation of the polyesters can be effected in a conventional manner by reacting dicarboxylic acids, esters thereof or other ester-forming derivatives with dihydroxy compounds.

Suitable dicarboxylic acids are, for example, aliphatic and aromatic dicarboxylic acids which can also be used in the form of a mixture. Examples are naphthalenedicarboxylic acids, terephthalic acid, isophthalic acid, adipic acid, azelaic acid, sebacic acid, dodecanoic acid and cyclohexanedicarboxylic acids, mixtures thereof and ester-forming derivatives thereof.

The dihydroxy compounds used are preferably diols of 2 to 6 carbon atoms, particularly preferably ethylene glycol, 1,4-butanediol, 1,4-butenediol and 1,6-hexanediol; but it is also possible to use 1,4-hexanediol, 1,4-cyclohexanediol, 1,4-di(hydroxymethyl)cyclohexane, bisphenol A, neopentylglycol, mixtures thereof and ester-forming derivatives thereof.

Polyesters of terephthalic acid and of a C$_2$–C$_6$-diol component, for example polyethylene terephthalate or polybutylene terephthalate, are particularly preferred.

The relative viscosity $\eta_{spec}/c$ of the polyesters, measured on a 0.5% strength solution in a phenol/o-dichlorobenzene mixture (weight ratio 3:2) at 25° C., is in general within the range from 1.2 to 1.8 ml/g.

The proportion of component (B) in the molding materials according to the invention is, like that of component (A), not critical, but is preferably from 8 to 90% by weight, based on the total weight of components (A)+(B)+(C).

Component (C)

The thermoplastic molding materials according to the invention contain as essential component (C) a graft copolymer which is based on ($C_1$) from 60 to 99% by weight of an elastomeric component based on acrylic acid esters, methacrylic acid esters and/or conjugated dienes as well as, if desired, further comonomers, as graft base and ($C_2$) from 1 to 40% by weight of an epoxy-containing monomer as applied graft.

The elastomeric component (rubber component $C_1$) has in general a glass transition temperature of below 0° C., preferably of below −20° C. Preferred rubber components are homopolymers of alkyl acrylates and/or methacrylic alkylates of 1 to 8 carbon atoms in the alkyl radical and/or homopolymers and/or copolymers of conjugated dienes, for example 1,3-butadiene and isoprene. A particularly preferred example is a rubber component (elastomer) based on polybutadiene and/or poly(n-butyl acrylate).

If desired, in the preparation of the elastomeric component, additional comonomers, preferably aromatic vinyl monomers of up to 12 carbon atoms, for example styrene or styrene/acrylonitrile mixtures, can be used.

A suitable component ($C_2$) can in principle be any epoxy-containing monomer which can be grafted onto the graft base ($C_1$). Results to date indicate that a reaction takes place between the epoxy group of the graft copolymer and the polyester or polycarbonate. It is still too early to say with certainty whether true covalent bonds are formed. The interaction between the epoxy group of the graft copolymer and the polyester or polycarbonate is probably responsible for the compatibility-increasing effect of the graft copolymer.

Examples of the numerous suitable epoxy-containing monomers are glycidyl derivatives, in particular glycidylacrylic acid esters and/or glycidylmethacrylic acid esters, which are preferred on account of their easy availability.

The graft copolymer (C) can be prepared in a plurality of ways which are known per se. The only significant point is that the epoxy groups of the applied graft are available in the free form in the eventual copolymer. Thus the graft base can be prepared for example by successive polymerization of the individual monomers or by simultaneous use of all the monomers. The grafting of the epoxy-containing graft monomer can also be carried out in the presence of further monomers which do not react with the epoxy group. Further details of the method of preparation can be found for example in DE-C No. 1,260,135.

The proportion of component ($C_1$) in the graft copolymer ranges from 60 to 99% by weight, preferably from 90 to 98% by weight, and the proportion of the elastomeric component ($C_2$) ranges correspondingly from 1 to 40% by weight, preferably from 2 to 10% by weight.

The proportion of component (C) in the thermoplastic molding materials according to the invention lies within the range from 1 to 30, preferably from 2 to 20, % by weight.

The graft copolymer (C) can be present in components (A) (polycarbonate) and (B) (polyester) in dispersed form with a unimodal particle size distribution within the range from 50 to 200 nm (i.e. the distribution curve of the particle sizes has only one peak) or with a bimodal particle size distribution within the range from 50 to 700 nm (i.e. the distribution curve has two peaks).

In addition to components (A), (B) and (C), the molding materials according to the invention can contain elastomeric constituents which improve the impact strength (impact strength modifier rubbers). Rubbers which can be used for this purpose are known per se to those skilled in the art. For example, it is possible to use rubbers whose composition is identical or similar to that of rubber component ($C_1$) of the graft copolymer. Further examples are butadiene, styrene and block copolymers, styrene/acrylonitrile copolymers, acrylonitrile/butadiene/styrene copolymers, to name only a few. The proportion of impact strength modifier rubbers is in general not more than 20% by weight, based on the total weight of components (A) to (C).

The molding materials according to the invention can further contain additives and processing aids. Examples are stabilizers, antioxidants, agents against thermal decomposition and decomposition by ultraviolet light, lubricants, mold release agents, colorants, reinforcing agents and metal flakes and/or metal-coated fibers to increase the electroconductivity, and also plasticizers.

Stabilizers may be added at any stage in the preparation of the molding materials, but are preferably added very early on to prevent the onset of decomposition before the stabilizer has been incorporated.

Antioxidants and heat stabilizers for polymers are known to those skilled in the art. Examples are the halides of metals of group 1, sterically hindered phenols, hydroquinones, substituted derivatives thereof and mixtures thereof. The concentration of these additives is in general not more than 1% by weight, based on the total weight of the molding materials.

UV stabilizers are likewise known to those skilled in the art. Examples are substituted resorcinols, salicylates, benzotriazoles and benzophenones. The proportion of these stabilizers is in general up to 2% by weight, based on the total weight of the molding materials.

Lubricants and mold release agents, which in general may account for up to 1% by weight of the thermoplastic molding material, are for example stearic acid, stearyl alcohol, stearic acid esters and amides thereof.

Examples of dyes and pigments are nigrosine, titanium dioxide, cadmium sulfide, cadmium sulfide selenide, phthalocyanines, ultramarine blue and carbon black; examples of fillers and reinforcing agents are carbon fibers, glass fibers, amorphous silica, asbestos, calcium silicate, aluminum silicate, magnesium carbonate, kaolin, chalk, quartz powder, mica and feldspar.

It is also possible to add nucleating agents such as talcum, $CaF_2$, sodium phenylenephosphinate, aluminum oxide and finely divided polytetrafluoroethylene (PTFE) as well as plasticizers such as phthalic acid esters and benzene- and/or toluene-sulfonamides.

The proportion of all the abovementioned additives is not critical as such, but it is of course necessary to ensure that as a whole the components are compatible in the amounts used.

If metal flakes, for example of aluminum, copper, silver or nickel or alloys thereof, or fibers made of silver, copper, nickel, aluminum or stainless steel are added to the thermoplastic molding materials according to the invention, this appreciably increases the conductivity of the molding materials, as a result of which they can be used to screen off electromagnetic waves.

To increase the conductivity it is also possible to add glass, graphite and/or aramide fibers which are coated with nickel, silver, copper or aluminum. On adding up to 40% by weight, preferably from 25 to 30% by weight, based on the total weight of the molding material, of these conductivity-increasing additives and maintaining the ratio of metal flakes:metal fibers or metal-coated fibers within the preferred range of from 4:1 to 14:1, the conductivity of the molding material increases from $10^{-18}$ Scm$^{-1}$ to 1 Scm$^{-1}$.

The molding materials according to the invention can be prepared in a conventional manner, for example by melt-mixing the polyester and the polycarbonate with the other components in an enclosed system. This customarily takes the form of a multiple screw extruder, for example a 2-shaft extruder, or other conventional plasticizing apparatus, for example a Brabender mill, a Banbury mill or the like. But the molding materials can also be prepared by coprecipitation from a solution or by mixing (dry mixing) the components and subsequently melt extruding the dry mixture.

The thermoplastic molding materials according to the invention exhibit a high notched impact strength even at low temperatures and a high chemical resistance. They are suitable for processing by injection molding and extruding and for producing highly stressable thermostable impact-resistant moldings for industrial purposes of any kind. Molding materials according to the invention filled with conductive additives can be used for screening off electromagnetic waves.

EXAMPLES 1 TO 11

In the examples, the components used were as follows:

Component (A) (polycarbonate)

Bisphenol-A polycarbonate having a relative viscosity of 1.36, measured on a 0.5% strength solution in dichloromethane at 25° C.

Component (B) (polyester)

(B$_1$) Polybutylene terephthalate having a relative viscosity of 1.62, measured on a 0.5% strength solution in a phenol/o-dichlorobenzene mixture (weight ratio 3:2) at 25° C.

(B$_2$) Polyethylene terephthalate having a relative viscosity of 1.39, measured under the same conditions as described for (B$_1$).

Component (C) (graft copolymer)

A polybutadiene latex was prepared by polymerizing 60 parts by weight of butadiene in the presence of a solution of 0.5 part of tert.-dodecylmercaptan, 0.7 part of potassium C$_{14}$-alkylsulfonate as emulsifier, 0.2 part of potassium peroxodisulfate and 0.2 part of sodium pyrophosphate in 80 parts of water at 65° C. After the polymerization had ended, the polymerization autoclave was let down; the conversion was 98%.

The average particle size of the polybutadiene latex thus obtained was 0.1 μm. This latex was agglomerated by adding 25 parts by weight of an emulsion of a copolymer of 96 parts by weight of ethyl acrylate and 4 parts of acrylamide (solids content of emulsion: 10% by weight) to form a polybutadiene latex having an average particle size of from 0.3 to 0.4 μm.

The polybutadiene latex (C$_1$) thus obtained was mixed in the amounts stated in Table 1 with the amount stated in Table 1 in the SAN column of a mixture of styrene and acrylonitrile (ratio 70:30) and 50 parts by weight of water. 0.08 part by weight of potassium persulfate and 0.05 part by weight of lauroyl peroxide were added, and the mixture was heated with stirring at 65° C. for 3 hours. The amount of glycidyl methacrylate stated in Table 1 in the C$_2$ column was then added without further additives in the course of 2 hours, during which the temperature was 65° C. The graft copolymer thus prepared was precipitated at 95° C. out of the dispersion by means of magnesium sulfate solution, was washed with water and was dried in a warm air stream.

TABLE 1

|  | C$_1$ % wt. | SAN % wt. | C$_2$ % wt. |
|---|---|---|---|
| Graft copolymers according to the invention | | | |
| C$_a$ | 60 | 35 | 5 |
| C$_b$ | 67 | 30 | 3 |
| C$_c$ | 63 | 29[1] | 8 |
| Graft copolymers for comparison | | | |
| C$_d$ | 60 | 35 | 5[2] |
| C$_e$ | 67 | 30 | 3[2] |

[1]Methyl methacrylate instead of styrene/acrylonitrile
[2]Methyl methacrylate instead of glycidyl methacrylate Components (A) to (C) were mixed in a twin-screw extruder at 270° C., and the extrudate was granulated and processed into moldings.

The composition of the modling materials and the results of the impact strength measurements and of the determination of the Vicat temperature can be found in Table 2 below.

TABLE 2

| Example No. | Component A (in percent by weight) | Component B | Component C | Notched impact strength [kJm$^{-2}$] 23° C. | −20° C. | −40° C. | Vicat temp. °C. |
|---|---|---|---|---|---|---|---|
| 1* | 50 | 40 B$_a$ | 10 C$_d$ | 45 | 8 | 6 | 120 |
| 2* | 50 | 40 B$_a$ | 10 C$_e$ | 42 | 8 | 7 | 122 |
| 3* | 75 | 15 B$_b$ | 10 C$_e$ | 41 | 7 | 6 | 130 |
| 4* | 40 | 50 B$_b$ | 10 C$_d$ | 40 | 8 | 5 | 128 |
| 5 | 50 | 40 B$_a$ | 10 C$_a$ | 47 | 19 | 12 | 123 |
| 6 | 40 | 50 B$_a$ | 10 C$_b$ | 45 | 13 | 9 | 119 |
| 7 | 40 | 40 B$_a$ | 20 C$_c$ | 50 | 15 | 10 | 120 |
| 8 | 75 | 15 B$_b$ | 10 C$_b$ | 50 | 31 | 9 | 139 |
| 9 | 50 | 35 B$_b$ | 15 C$_a$ | 52 | 19 | 11 | 134 |
| 10 | 45 | 5 B$_a$ 35 B$_b$ | 10 C$_b$ | 41 | 10 | 6 | 125 |

TABLE 2-continued

| Example No. | (in percent by weight) Component A | Component B | Component C | Notched impact strength [kJm$^{-2}$] 23° C. | −20° C. | −40° C. | Vicat temp. °C. |
|---|---|---|---|---|---|---|---|
| 11[1] | 45 | 42 B$_b$ | 8 C$_b$ | 45 | 14 | 7 | 129 |

\* = comparative examples
[1] An impact strength modifier rubber was added in the form of 5% by weight of an ethylene/n-butylacrylate/acrylic acid copolymer prepared under superatmospheric pressure from 60% by weight of ethylene, 35% by weight of n-butyl acrylate and 5% by weight of acrylic acid.

The results show that the thermoplastic molding materials according to the invention have a distinctly increased notched impact strength at low temperatures (−20° C. and −40° C.) compared with conventional molding materials. The Vicat temperature of molding materials according to the invention is likewise above that of conventional molding materials of corresponding polycarbonate/polyester compositions.

We claim:

1. A thermoplastic molding material containing as essential components:
   (A) an aromatic polycarbonate derived from diphenols;
   (B) an aromatic polyester derived from dicarboxylic acids or their ester forming derivatives and dihydroxy components; and
   (C) from 1 to 30% by weight, based on (A)+(B)+(C), of a graft copolymer consisting of as essential components:
      (C1) from 60 to 99% by weight of an elastomeric component based on at least one member selected from the group consisting of acrylic acid esters, methacrylic acid esters and conjugated diene compounds, as essential components, which functions as a graft base, and
      (C2) from 1 to 40% by weight of an epoxy-containing monomer as an applied graft shell onto component C$_1$.

2. The thermoplastic molding material as defined in claim 1, which contains an impact strength modifier rubber.

3. The thermoplastic molding material as defined in claim 1, which contains from 8 to 90% by weight of polycarbonate (A), from 8 to 90% by weight of polyester (B) and from 2 to 30% by weight of graft copolymer (C).

4. A molding obtainable from a thermoplastic molding material as defined in claim 1.

5. The thermoplastic molding material as defined in claim 1, wherein further comonomers are present in said graft base.

6. The thermoplastic molding material as defined in claim 5, wherein said comonomer is styrene or a mixture of styrene and acrylonitrile.

7. The thermoplastic molding material as defined in claim I, wherein the diphenol component of component (A) is a dihydroxybiphenyl, a di (hydroxyphenyl)alkane or a di(hydoxyphenyl)ether.

8. The thermoplastic molding material as defined in claim 1, wherein the amount of said graft copolymer (C) in said composition ranges from 2-20% by weight.

9. The thermoplastic molding material as defined in claim 1, wherein said epoxy-containing monomer is a member selected from the group consisting of glycidylacrylic acid esters, glycidylmethacrylic acid esters and mixtures thereof.

* * * * *

UNITED STATES PATENT AND TRADEMARK OFFICE
CERTIFICATE OF CORRECTION

PATENT NO. :   4,774,286

DATED      :   Sep. 27, 1988

INVENTOR(S) :  Christof TAUBITZ et al.

It is certified that error appears in the above-identified patent and that said Letters Patent is hereby corrected as shown below:

On the Title Page, Item [75]:

The nationality of the inventors has been left off; all of the inventors are citizens of the Federal Republic of Germany.

Signed and Sealed this

Seventh Day of March, 1989

Attest:

DONALD J. QUIGG

Attesting Officer

Commissioner of Patents and Trademarks